United States Patent
Suzuki

(10) Patent No.: US 7,612,918 B2
(45) Date of Patent: Nov. 3, 2009

(54) IMAGE PROCESSING APPARATUS

(75) Inventor: Tomohisa Suzuki, Yokohama (JP)

(73) Assignees: Kabushiki Kaisha Toshiba, Tokyo (JP); Toshiba Solutions Corporation, Tokyo (JP)

( * ) Notice: Subject to any disclaimer, the term of this patent is extended or adjusted under 35 U.S.C. 154(b) by 562 days.

(21) Appl. No.: 11/391,219

(22) Filed: Mar. 29, 2006

(65) Prior Publication Data
US 2006/0221410 A1    Oct. 5, 2006

(30) Foreign Application Priority Data
Mar. 29, 2005   (JP)   .................... P2005-096213

(51) Int. Cl.
*H04N 1/38*    (2006.01)
(52) U.S. Cl. .................. 358/3.26; 358/463; 382/275
(58) Field of Classification Search .................. 358/1.1, 358/1.9, 2.99, 3.01, 3.26, 448, 463, 464; 382/173, 176, 254, 275
See application file for complete search history.

(56) References Cited

U.S. PATENT DOCUMENTS

| | | | |
|---|---|---|---|
| 6,323,957 B1 * | 11/2001 | Ball | 358/1.9 |
| 6,470,094 B1 * | 10/2002 | Lienhart et al. | 382/176 |
| 6,473,522 B1 | 10/2002 | Lienhart et al. | |
| 6,981,644 B2 | 1/2006 | Cheong et al. | |
| 7,206,445 B2 | 4/2007 | Takemoto | |

FOREIGN PATENT DOCUMENTS

| | | |
|---|---|---|
| CN | 1419679 A | 5/2003 |
| EP | 1 130 898 A2 | 9/2001 |
| GB | 2 403 007 A | 12/2004 |
| JP | 63-155369 | 6/1988 |
| JP | 2-28897 | 1/1990 |
| JP | 2001-222683 | 8/2001 |
| JP | 2001-251531 | 9/2001 |
| WO | WO 01/69530 A2 | 9/2001 |
| WO | WO 03/041014 A1 | 5/2003 |

OTHER PUBLICATIONS

"Digital Image Processing", Computer Graphic Arts Society, (CG-ARTS Society), pp. 108-113, and pp. 179-180, (2004).
Notification of First Office Action issued by the Chinese Patent Office on Oct. 12, 2007, for Chinese Patent Application No. 2006100674870, and English-language translation thereof.
English abstract of CN 1578969 published Feb. 9, 2005.
English abstract of CN 1307317 published Aug. 8, 2001.

* cited by examiner

*Primary Examiner*—Thomas D Lee
(74) *Attorney, Agent, or Firm*—Finnegan, Henderson, Farabow, Garrett & Dunner, L.L.P.

(57) ABSTRACT

An image processing apparatus of the present invention includes: a background density distribution estimating part 12 that estimates density distribution of background pixels; an area density distribution estimating part 13 that estimates density distribution in each of areas into which an input image is divided; an entry existence judging part 14 that judges the existence or not of the entry of predetermined information based on the density distribution of the background pixels and the density distribution in the relevant area; and a judgment result output part 15 that outputs a judgment result indicating whether or not there exists the entry of the predetermined information in the area being the judgment target of the entry existence judging part 14.

11 Claims, 12 Drawing Sheets

IMAGE PROCESSING APPARATUS

CROSS-REFERENCE TO RELATED APPLICATIONS

This application is based upon and claims the benefit of priority from the prior Japanese Patent Application No. 2005-96213, filed on Mar. 29, 2005; the entire contents which are incorporated herein by reference.

BACKGROUND

1. Field of the Invention

The present invention relates to an image processing apparatus, an image processing method, and an image processing program which eliminate the influence of noise in a background area in an image of a document or a sheet by extracting an area including pixels that are colored by the entry of predetermined information such as a character into the document or the sheet.

2. Description of the Related Art

Various methods have been proposed as a method of eliminating noise from a gray-scale image of a document. One of conventional noise eliminating arts smoothes a gray-scale image by an averaging filter or a Gaussian filter (see, for example, Non-patent Document 1, pp. 108-110).

Further, one of methods described in the non-patent document 1 performs a morphology operation such as opening on a binary image (the same document pp. 179-180).

Non-patent Document 1 also discloses, as a method of generating a binary image with less noise influence, a method of eliminating isolated points from the binary image by a median filter or the like (the same document p. 113).

However, in a case where density distribution in a background portion is wide and largely overlapped with density distribution of black pixels caused by entry, if an area where the density of background pixels happens to be high is too large to be recognized as an isolated point, these methods cannot eliminate this area as noise.

[Non-patent Document 1] Digital Image Processing, Computer Graphic Arts Society (CG-ARTS Society), Jul., 2004, pp. 108-113, pp. 179-180

SUMMARY

As described above, the conventional methods sometimes cannot eliminate noise when the density distribution in the background portion is wide and largely overlapped with the density distribution of the black pixels caused by the entry.

The use of the conventional methods for judging whether or not the entry exists in a designated area is likely to lead to misjudgment on the existence or not of the entry of a character or the like if background noise is prominent as described above.

The present invention was made in order to solve such a problem and it is an object thereof to provide an image processing apparatus, an image processing method, and an image processing program capable of eliminating the influence of background noise from an original image having the entry of predetermined information such as a character, thereby contributing to subsequent processing (such as character recognition).

An image processing apparatus according to one embodiment of the present invention includes: a background density distribution estimating part that estimates density distribution of pixels in a background area in an image to be processed; an area density distribution estimating part that estimates density distribution in a designated area in the image; and an entry existence judging part that judges existence or not of entry of predetermined information in the designated area, based on the density distribution of the pixels in the background area estimated by the background density distribution estimating part and the density distribution in the designated area estimated by the area density distribution estimating part.

An image processing method according to one embodiment of the present invention is an image processing method where a computer processes an image, including: estimating, by the computer, density distribution of background pixels out of pixels forming the image to be processed; estimating, by the computer, density distribution in a predetermined area in the image; judging, by the computer, existence or not of entry of a character, which is predetermined information, in the designated area, based on the estimated density distribution of the background pixels and the estimated density distribution in the designated area.

An image processing program according to one embodiment of the present invention is an image processing program for causing a computer to execute image processing, including program codes for causing the computer to function as: a background density distribution estimating part that estimates density distribution of pixels in a background area in an image to be processed; an area density distribution estimating part that estimates density distribution in a designated area in the image; and an entry existence judging part that judges existence or not of entry of predetermined information in the designated area, based on the density distribution of the pixels in the background area estimated by the background density distribution estimating part and the density distribution in the designated area estimated by the area density distribution estimating part.

DETAILED DESCRIPTION

Description of Embodiments

Figure 1:
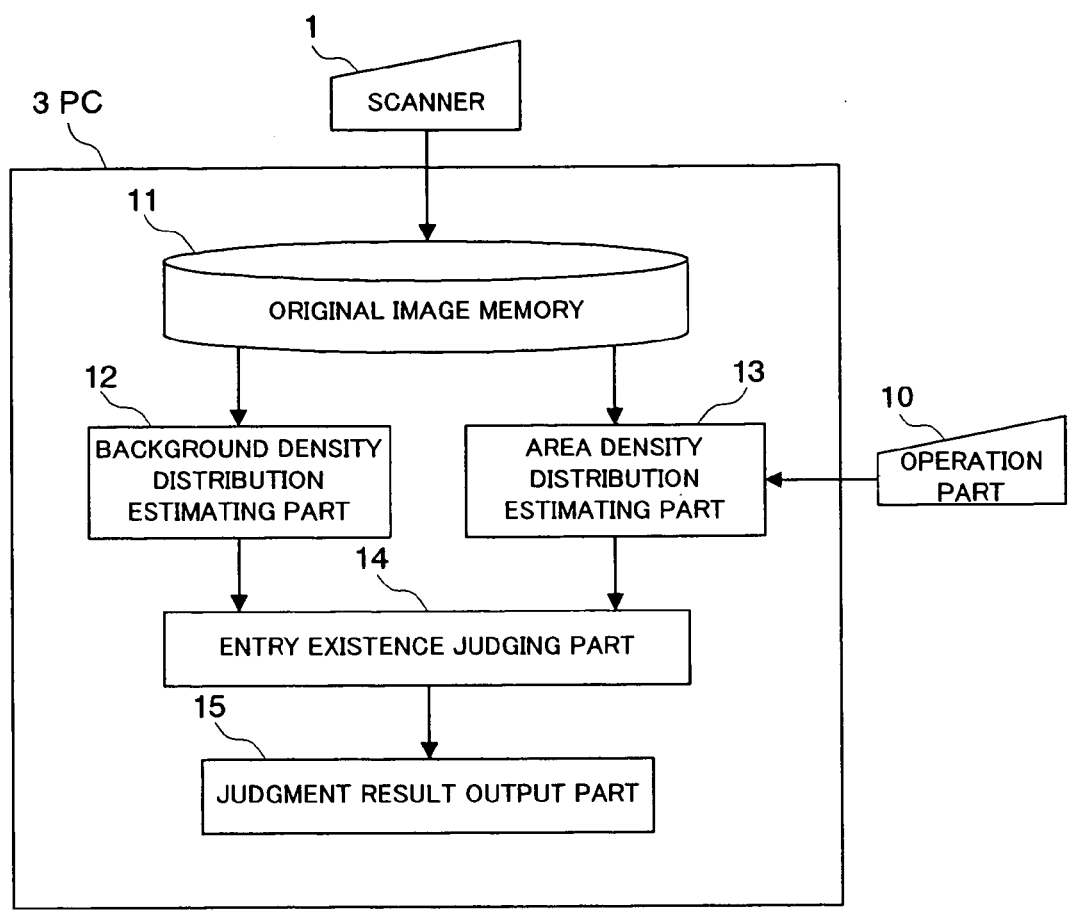
FIG. 1 is a block diagram showing a configuration of an image processing apparatus according to a first embodiment of the present invention.

Hereinafter, embodiments of the present invention will be described in detail with reference to the drawings.

The drawings, though referred to in describing the embodiments of the present invention, are provided only for an illustrative purpose and in no way limit the present invention.

In an image processing apparatus according to an embodiment of the present invention, a background density distribution estimating part estimates density distribution of background pixels of an original image of a document or a sheet to which predetermined information is expected to have been entered.

An area density distribution estimating part estimates density distribution in a designated area in the original image.

An entry existence judging part judges existence or not of entry of the predetermined information in the designated area, based on the density distribution of the background pixels and the density distribution in the designated area.

The area density distribution estimating part estimates density distribution in each of small areas into which the image is divided.

The entry existence judging part judges the existence or not of the entry of the predetermined information in each of the small areas into which the image is divided, based on the density distribution in each of the small areas and the density distribution of the background pixels of the image.

The density of the small area judged as having no entry of the predetermined information as a result of this judgment is replaced by background density estimated by the background density estimating part, whereby noise is eliminated from the original image.

The entry existence judging part judges the existence or not of the entry of the predetermined information in each of small areas into which the image is divided in a first direction (longitudinal direction), based on density distribution in each of the small areas and the density distribution of the background pixels.

Thereafter, an area detector couples contiguous small areas out of the small areas which are judged as having the entry of the predetermined information by the entry existence judging part, and detects a resultant area as a line area of the predetermined information.

The area density distribution estimating part estimates density distribution in each of small areas into which the line area detected by the area detector is further divided in a second direction intersecting with the first direction.

Thereafter, the entry existence judging part judges the existence or not of the entry of the predetermined information in each of the small areas based on the density distribution of the background pixels and the density distribution of each of the small areas.

Then, a second area detector couples contiguous small areas out of the small areas which are judged as having the entry of the predetermined information by the entry existence judging part, and detects a resultant area as an area including an entry region of the predetermined information, that is, an area including a character or a character group.

In an image in which each pixel is represented by a set of plural density values, a set of M pieces of the density values of each of the pixels is converted to a set of N pieces of density values in a representation format same as or similar to a representation format of a set of the density values of the image.

The background density estimating part estimates the density distribution of the background pixels in the image in which a set of the density values has been converted.

The area density distribution estimating part estimates the density distribution in each of the small areas generated by the division of the designated area in the image in which a set of the density values has been converted.

The entry existence judging part judges the existence or not of the entry of the predetermined information in an area in the image based on the estimated density distribution of the background pixels and the estimated density distribution in the area.

A set of the density values in the area which is judged as having no entry of the predetermined information as a result of the above judgment is replaced by a set of the background density values estimated by the background density estimating part, whereby noise is eliminated from the original image.

In this case, noise can be effectively eliminated even when the image to be processed is a color image.

Based on the above, the embodiments of the present invention will be described below in detail with reference to the drawings.

First Embodiment

Figure 2:
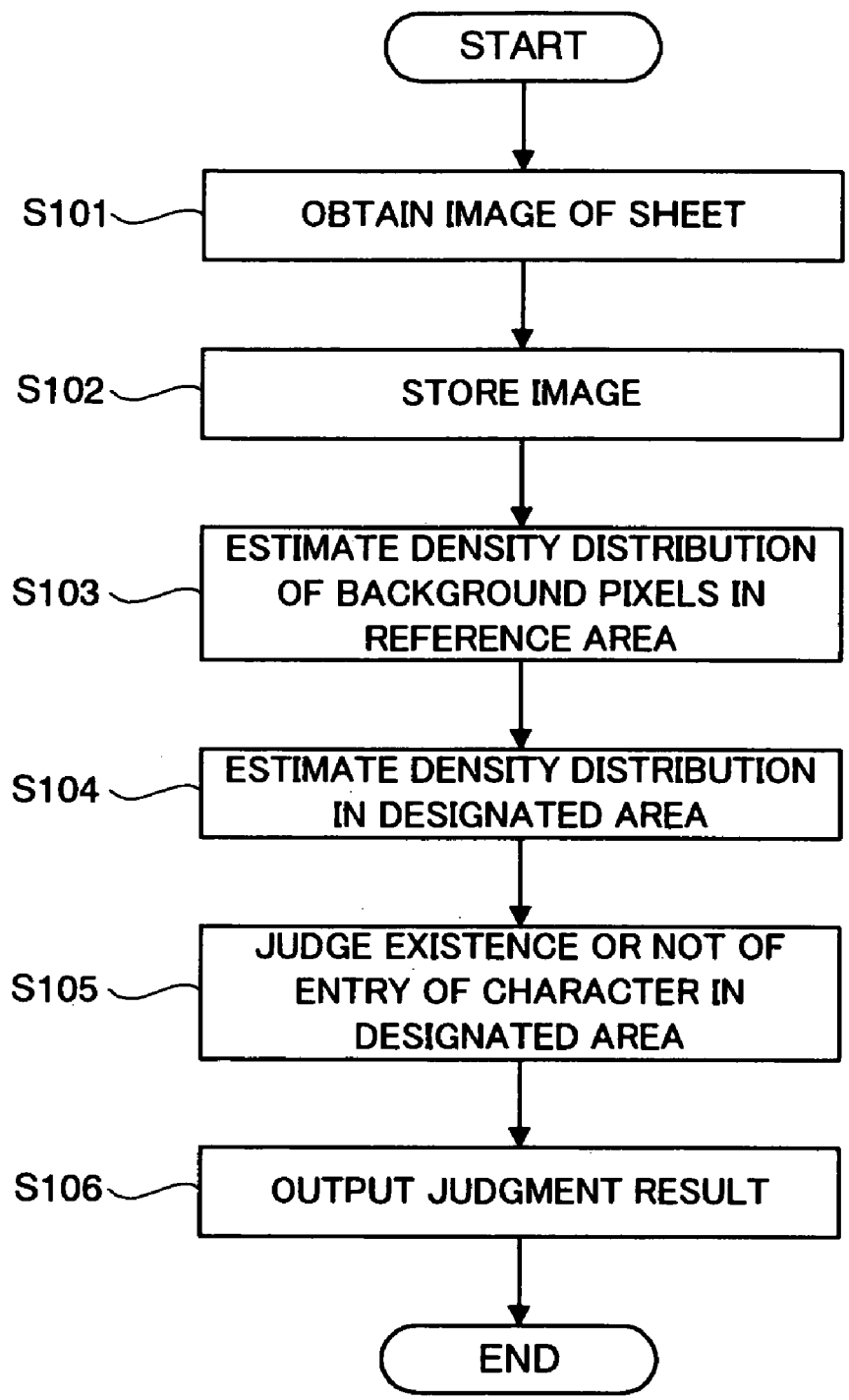
FIG. 2 is a flowchart showing the operation of the image processing apparatus of the first embodiment.

FIG. 1 is a diagram showing a configuration of an image processing apparatus according to a first embodiment of the present invention, and FIG. 2 is a flowchart showing the operation of the image processing apparatus in FIG. 1.

As shown in FIG. 1, the image processing apparatus of the first embodiment includes a scanner 1 and a computer 3 (hereinafter, referred to as a PC 3) to which the scanner 1 is connected.

The scanner 1 functions as an image obtaining part reading and obtaining an image being a character recognition target on a front face of a sheet. It is assumed here that characters have been entered as predetermined information into the sheet.

Hereinafter, in the present invention, "entry" includes entry of characters or the like both by handwriting and by printing.

Image information may be obtained not only by the scanner 1 but also by conversion from a document file.

Further, image information stored in a different computer may be obtained by the PC 3 via a network such as a LAN.

Functions of the PC 3 are realized by the cooperation of hardware and programs: the hardware including a memory such as a CPU, a RAM, and a ROM, an auxiliary memory such as a hard disk drive, an input device such as a keyboard, a pointing device such as a mouse, a display device such as a monitor, an interface board with the scanner 1, and the like; and the programs including an operating system (hereinafter, refereed to as OS) and character recognition application software.

The CPU stands for a central processing unit.

The programs are executed on the CPU controlling a computer and instruct the computer to execute an image processing method by this image processing apparatus.

Specifically, the PC 3 has functions of an operation part 10, an original image memory 11, a background density distribution estimating part 12, an area density distribution estimating part 13, an entry existence judging part 14, a judgment result output part 15, and so on.

The operation part 10 includes, for example, an input device such as a keyboard or a mouse, a display device, and so on and accepts an operation for image processing inputted to the PC 3.

For example, the operation part 10 functions as a part via which an area to be processed in an image is designated.

The original image memory 11 stores the image information (hereinafter, referred to as an original image) obtained by the scanner 1.

The background density distribution estimating part 12 reads an original image to be processed, which is stored in the original image memory 11, to estimate the density distribution of pixels in a background area in the original image.

That is, the background density distribution estimating part 12 estimates the density distribution of the pixels in the background area in an inputted image.

The background density distribution estimating part 12 estimates the density distribution of pixels in a background portion contiguous to an image being a character recognition target in the original image.

Specifically, the background density distribution estimating part 12 defines, as a reference area, either a blank area in the original image where no image of the character recognition target exists or an area in a white sheet prepared in advance, and creates a histogram of the density distribution of pixels in the reference area.

The background density distribution estimating part 12 uses the created histogram of the density distribution of the pixels to estimate the distribution of the density (background density) of the pixels in the background portion contiguous to the image being the character recognition target in the original image.

Figure 16:
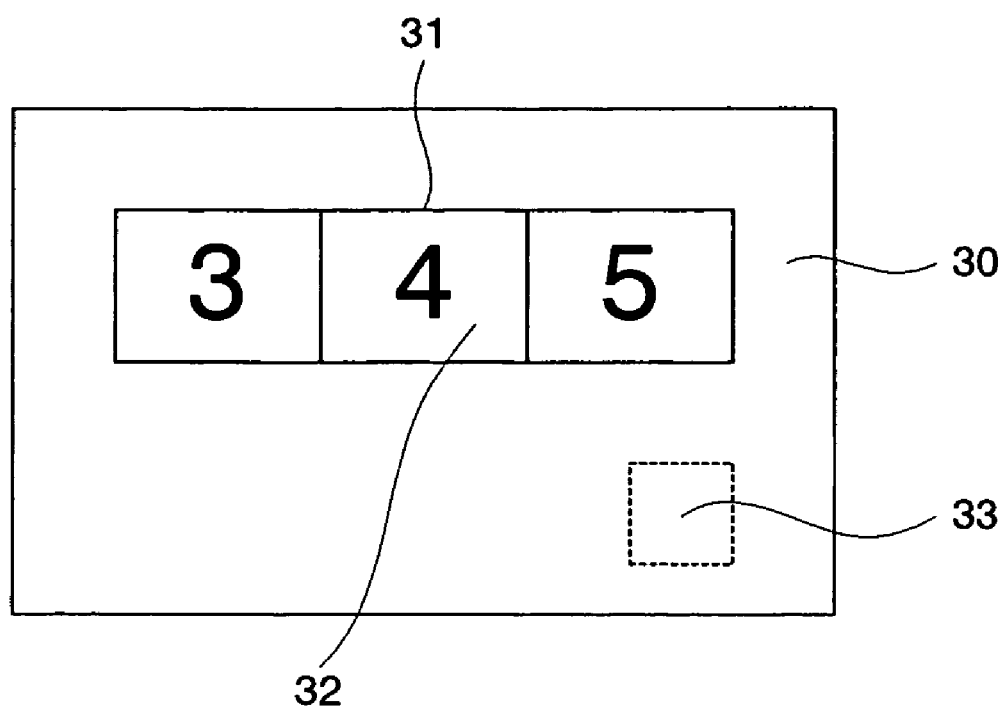
FIG. 16 is a view showing a format on a sheet.

FIG. 16 shows a sheet 30 having numerals such as "354" entered into a character entry area defined by a ruled line 31.

When the density distribution in a background portion 32 contiguous to the numeral "5" which is a character recognition target is to be estimated in this sheet 30, a blank portion 33, for example, is designated as a reference area, and the density distribution of pixels in the background portion 32 is estimated based on the density distribution of pixels in the blank portion 33.

The reference area can be determined in the following manner. That is, coordinate values of a reference area are stored in correspondence to each kind of sheet in advance in a memory provided in the background density distribution estimating part 12, and every time the background density distribution is estimated, the coordinate values of the reference area stored in the memory in correspondence to a relevant sheet are read, and an area corresponding to the read coordinate values is determined as a reference area in the original image stored in the original image memory 11.

Another possible way is, for example, to read an image of a white sheet stored in a memory, as an image of a reference area.

A still another possible way of designating a reference area is to display an original image on a display device and designate an area on the original image by using a mouse.

The area density distribution estimating part 13 reads the original image from the original image memory 11 and estimates the density distribution in a designated area.

That is, the area density distribution estimating part 13 estimates the density distribution of pixels in the designated area in the original image.

The density distribution of the pixels is estimated based on, for example, a histogram of the density of the pixels.

Another possible method of estimating the density distribution is to use, for example, a k-means or the like, and any method may be used providing that it can estimate the density probability distribution.

The designated area as a target of the density distribution estimation is designated in the following manner.

First, coordinate values representing areas each having an image, which is a character recognition target, are stored in advance in correspondence to respective kinds of sheets in a not-shown memory provided in the area density distribution estimating part 13, and the area density distribution estimating part 13 determines the designated area based on the coordinate values registered in the memory.

For example, areas surrounded by the ruled line 31 and having the numerals "3", "5", "4" entered therein are designated areas on the sheet 30 shown in FIG. 16.

Another possible method of determining a designated area is to designate, with a mouse, a region in the original image displayed on the display device of the operation part 10.

The entry existence judging part 14 judges the existence or not of the entry of predetermined information such as a character in the designated area, based on the density distribution of the background pixels estimated by the background density distribution estimating part 12 and the density distribution of pixels in the designated area estimated by the area density distribution estimating part 13.

In this event, the entry existence judging part 14 finds an evaluation value as a criterion for evaluating to what degree the density distribution in the designated area deviates from the density distribution in the background, and compares the evaluation value with a predetermined threshold value. When the evaluation value is equal to or larger than the predetermined threshold value, it is judged that the entry of a character exists, whereas it is judged that the entry of a character does not exist when the evaluation value is smaller than the threshold value.

As the evaluation value serving as a criterion for evaluating to what degree the density distribution in the designated area deviates from the density distribution in the background, usable is an evaluation value $E_1$ given by the following expression, where x is the density of pixels, f(x) is the density distribution in the background, and g(x) is the density distribution in the designated area.

$$E_1 = \int [f(x) - g(x)] \ln[f(x)] dx$$

Besides, an evaluation value $E_2$ given by the following expression is also usable.

$$E_2 = \int f(x) \{\ln[f(x)] - \ln[g(x)]\} dx$$

The evaluation value used here is not limited to the value given by either of the expressions but any evaluation value may be used providing that it reflects a deviation degree of the density distribution in the designated area from the density distribution in the background.

The judgment result output part 15 is constituted of, for example, at least one of a display device such as a monitor, a printing device such as a printer, and a storage device such as a hard disk drive and outputs the result of the judgment by the entry existence judging part 14.

The image processing apparatus of the first embodiment can be configurable by installing, in the PC 3, image processing recognition software realizing the present invention.

The following description will be given on assumption of such a configuration.

It should be noted that in the present invention, each of the components may be constituted by dedicated hardware or combination thereof, or they may be distributed on hardware in a distributed processing computer network or the like. Any structure not limited to the structure described here may be adopted for implementing the present invention, providing that it can realize the functions of the above-described parts.

Further, as long as the functions of the present invention are realizable, it is not essential to include all the components, but the structure without part of the functions may be used.

Hereinafter, the image processing apparatus of the first embodiment will be described with reference to the flowchart in FIG. 2.

In the case of this image processing apparatus, when an operator sets, on the scanner 1, a sheet having, for example, characters entered therein and performs a read operation with a keyboard or a mouse of the PC 3, the scanner 1 scans a front face of the sheet by a CCD image sensor or the like to obtain an image of the sheet (S101 in FIG. 2) and inputs the image to the PC 3. CCD stands for Charge Coupled Devices.

In the PC 3, the inputted image is stored in the original image memory 11 (S102) and is displayed on a screen of the display device.

Hereinafter, the inputted image is referred to as an original image.

The background density distribution estimating part 12 reads the original image stored in the original image memory 11 to estimate the density distribution of background pixels (S103).

The area density distribution estimating part 13 reads the original image stored in the original image memory 11 to estimate the density distribution in an area, in the original image, specified by the coordinate values for a designated area, the coordinate values being stored in advance in the not-shown memory and registered in correspondence to each kind of a sheet (S104).

The characters as the predetermined information are, for example, alphabets, numerals, kana characters, kanji characters, signs, drawings, and so on.

Next, the entry existence judging part 14 judges the existence or not of the entry of a character or the like in the designated area in the original image, based on the density distribution of the background pixels estimated by the background density distribution estimating part 12 and the density distribution of pixels in the designated area estimated by the area density distribution estimating part 13 (S105).

After the existence or not of the entry of a character or the like in the designated area is judged, the judgment result output part 15 outputs the result of the judgment by the entry existence judging part 14 to a screen of the display device, the printer, or the like (S106), so that the operator can confirm the result of the judgment (judgment accuracy or the like) by the PC 3 on the existence or not of the entry of a character or the like in the designated area.

In this manner, according to the image processing apparatus of the first embodiment, based on the estimation result of the density distribution of the background pixels in the original image and the estimation result of the density distribution in the area which is designated as a target of judgment on the existence or not of the entry of a character or the like, the existence or not of the entry of a character or the like in the designated area in the original image is judged. Therefore, it is possible to correctly judge the existence or not of the entry of a character or the like even when background noise in the original image is prominent.

Second Embodiment

Hereinafter, an image processing apparatus of a second embodiment of the present invention will be described.

Figure 3:
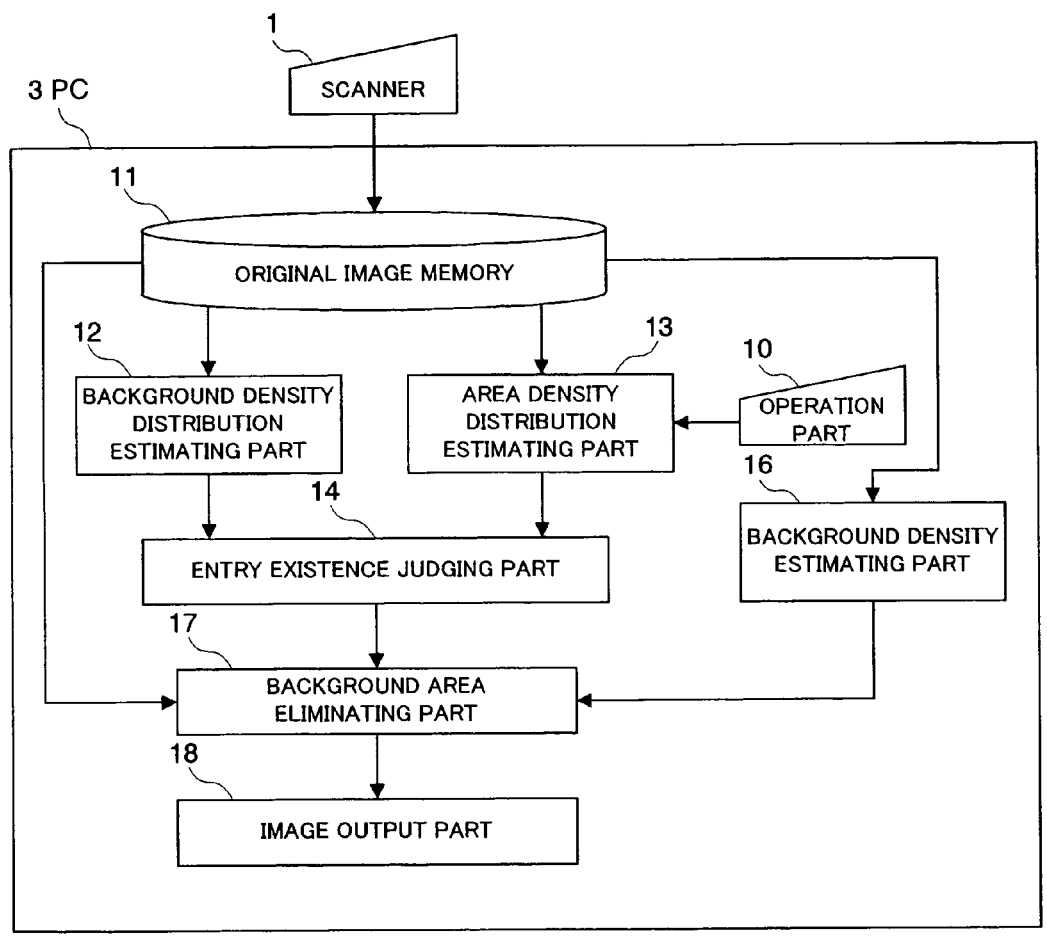
FIG. 3 is a block diagram showing a configuration of an image processing apparatus according to a second embodiment of the present invention.

FIG. 3 is a block diagram showing a configuration of the image processing apparatus of the second embodiment.

The image processing apparatus of the second embodiment includes a scanner 1 and a PC 3 as shown in FIG. 3.

The same reference numerals are used to designate the same components as those in the first embodiment, and description thereof will be omitted.

The PC 3 includes an operation part 10, an original image memory 11, a background density distribution estimating part 12, an area density distribution estimating part 13, an entry existence judging part 14, a background density estimating part 16, a background area eliminating part 17, a image output part 18 and so on.

The background density distribution estimating part 12, which is the same as that of the first embodiment, estimates the density distribution of background pixels.

The area density distribution estimating part 13 estimates the density distribution of pixels in each of small areas into which an original image is divided.

The density distribution is estimated by the same method as that used by the area density distribution estimating part 13 in the first embodiment.

The entry existence judging part 14 judges the existence or not of the entry of predetermined information in each of the small areas, based on the density distribution of the pixels estimated by the background density distribution estimating part 12 and the density distribution in each of the small areas estimated by the area density distribution-estimating part 13.

That is, the entry existence judging part 14 judges the existence or not of the entry of a character in each of the small areas into which the original image is divided, based on the density distribution of the background pixels and the density distribution in each of the small areas.

The background density estimating part 16 estimates the density in the background area in the original image.

The background density estimating part 16 defines, as a reference area, a pre-designated area having no character entered therein in the original image, and estimates the background density by finding a median value of the densities on this reference area.

For example, the blank portion 33 on the sheet 30 shown in FIG. 16 corresponds to the reference area.

A possible way of designating the reference area is to temporarily binarize the original image with a predetermined threshold value and, in an image generated by the binarization, it designate, as the reference area, a pixel set having no black pixel within a predetermined distance.

Any other method may be usable providing that it designates an area which can be expected to consist only of the background pixels.

The background area eliminating part 17 fills an area in the original image which is judged as having no entry of a character by the entry existence judging part 14, with the background density estimated by the background density estimating part 16.

That is, the background area eliminating part 17 functions as an area density replacing part that replaces the density in the small area in the original image which is judged as having no entry of a character by the entry existence judging part 14, by the background density estimated by the background density estimating part 16.

Hereinafter, the operation of the image processing apparatus of the second embodiment will be described with reference to FIG. 4 to FIG. 7.

The division of the original image into the small areas is done by dividing it in a vertical direction and in a lateral direction at a predetermined-pitch.

Figure 4:
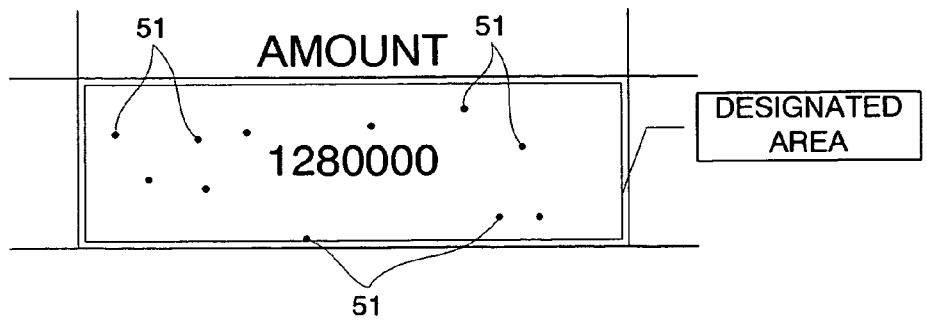
FIG. 4 is a view showing an example of an original image including noises in its background.
Figure 5:
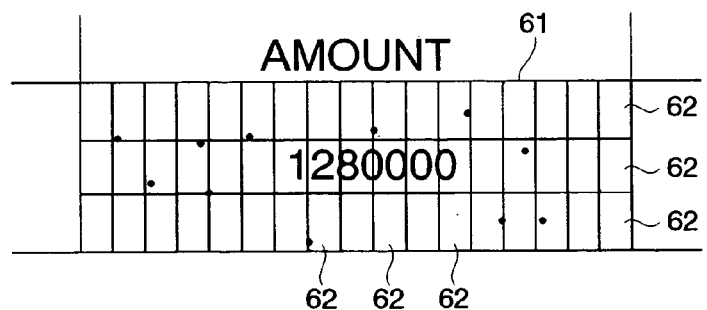
FIG. 5 is a view showing an example where the original image is divided into small areas.

For example, in a case where the original image includes noises 51 as shown in FIG. 4, if an area including entered characters is designated, a region 61 including at least the designated area is set and this region is divided into a plurality of small areas 62 as shown in FIG. 5.

Any method may be adopted for dividing an area in the original image, providing that the number of pixels in each of the small areas 62 becomes large enough to allow the estimation of the density distribution.

The entry existence judging part 14 judges the existence or not of the entry in each of the small areas 62 generated by the division, based on the density distribution of the background pixels estimated by the background density distribution estimating part 12 and the density distribution of the pixels in the relevant area estimated by the area density distribution estimating part 13.

That is, the entry existence judging part 14 judges the existence or not of the entry by the same method as that in the first embodiment.

The background area eliminating part 17 replaces the density of the pixels in an area which is judged as having no entry by the entry existence judging part 14, by the background density estimated by the background density estimating part 16, thereby correcting the original image.

Figure 6:
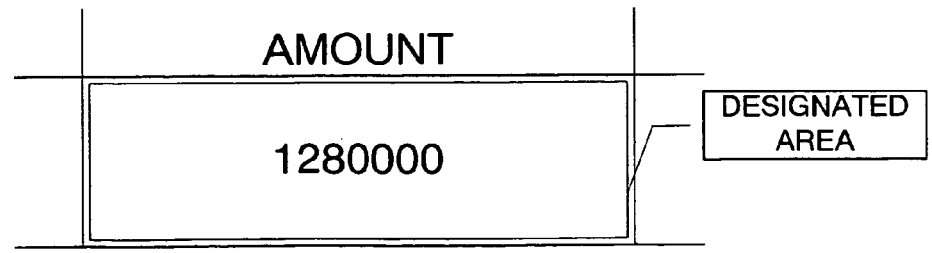
FIG. 6 is a view showing an example of an image obtained after the noises are eliminated from the original image.

This results in an image from which the noises that should exist in the background are eliminated, as shown in FIG. 6.

The image after the correction is outputted to paper, a display screen, a file, or the like by the image output part 18.

"To replace the density of pixels in an area by the background density" means "to fill the area with the same color as that of the background".

Figure 7:
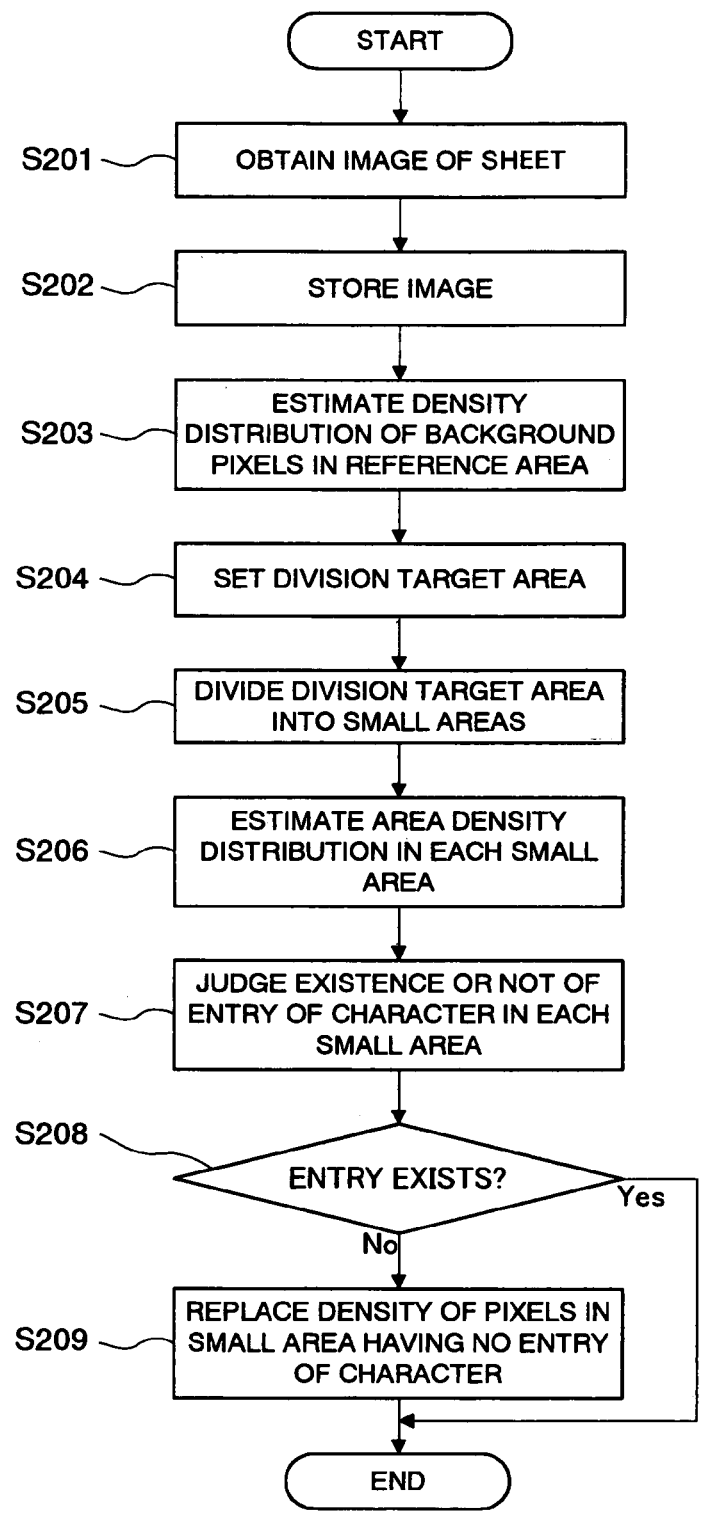
FIG. 7 is a flowchart showing the operation of the image processing apparatus of the second embodiment.

As in the first embodiment, this image processing apparatus obtains an image of a sheet by the scanner 1 and stores the obtained image in the original image memory 11 (S201 to S202 in FIG. 7).

The background density distribution estimating part 12 reads the original image stored in the original image memory 11 to estimate the density distribution of background pixels (S203).

A reference area can be designated by the same method as that in the first embodiment.

The area density distribution estimating part 13 sets a region including at least a desired designated area, as a division target area (S204) to equally divide this area into a plurality of small areas (S205), and it estimates the density distribution in each of the small areas generated by the division (S206).

The desired area means an image region which includes at least a portion having a character entered therein and from which noise is to be eliminated.

The entry existence judging part 14 judges whether or not the entry of a character exists (existence or not of the entry) in each of the small areas 62 into which the original image is divided, based on the density distribution of the background pixels and the density distribution in each of the small areas 62 (S207).

The existence or not of the entry of a character is judged based on the difference of the density distribution.

For example, an alphabet, a numeral, a kana character, a kanji character, a sign, a drawing, and the like correspond to a character.

When the above judgment turns out that no entry of a character or the like exists in the small area 62 (No at S208), the background area eliminating part 17 replaces the density of the pixels in the small area 62 which is judged as having no entry of a character by the entry existence judging part 14, by the background density estimated by the background density estimating part 16, thereby correcting the original image (S209).

That is, the background area eliminating part 17 fills the small area 62 which is judged as having no entry by the entry existence judging part 14, with the background density estimated by the background density estimating part 16.

Consequently, an image from which the noises existing in the background are eliminated is generated as shown in FIG. 6.

The image output part 18 performs at least one image output processing regarding the corrected image, namely, storing it in the hard disk drive under a different name from the file name of the original image, printing it on paper, or displaying it on the display screen.

Note that, when the entry existence judging part 14 judges that the entry of a character exists in the small area 62 (Yes at S208), the image correction processing is not applied to this small area.

As described above, the image processing apparatus of the second embodiment includes the background density estimating part 16 and the background area eliminating part 17 in addition to the structure of the first embodiment. Consequently, it is possible to eliminate noise from an area in a gray-scale image which can be judged as having no entry of a character.

Third Embodiment

Hereinafter, an image processing apparatus of a third embodiment of the present invention will be described.

Figure 8:
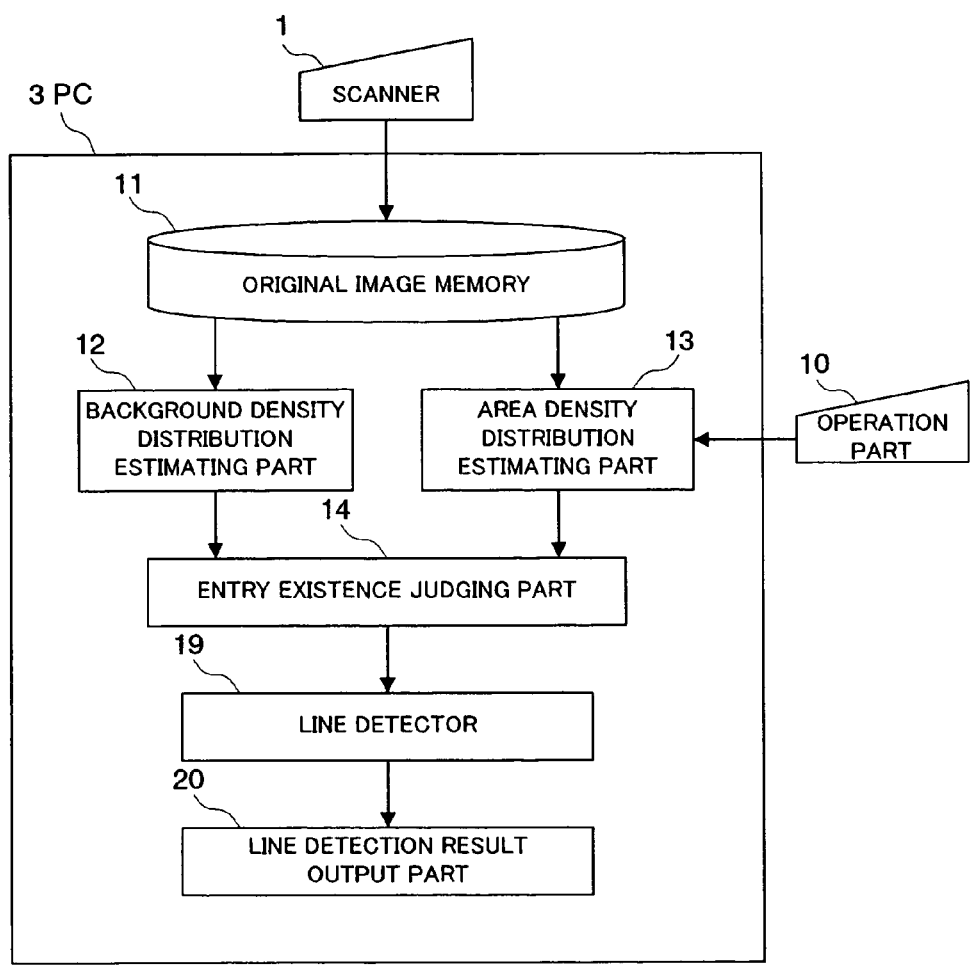
FIG. 8 is a block diagram showing a configuration of an image processing apparatus according to a third embodiment of the present invention.

FIG. 8 is a block diagram showing a configuration of the image processing apparatus of the third embodiment.

The image processing apparatus of the third embodiment includes a scanner 1 and a PC 3 as shown in FIG. 8.

In the third embodiment, the same reference numerals are used to designate the same components as those in the first embodiment, and description thereof will be omitted.

The PC 3 includes an operation part 10, an original image memory 11, a background density distribution estimating part 12, an area density distribution estimating part 13, an entry existence judging part 14, a line detector 19, a line detection result output part 20, and so on.

The background density distribution estimating part 12, whose function is the same as that in the first embodiment, estimates the density distribution of background pixels.

The area density distribution estimating part 13 divides an original image into a plurality of small areas with equal width, in a longitudinal direction (a direction in which the image is vertically divided at a predetermined pitch) and estimates the density distribution in each of the small areas generated by the division.

The density distribution is estimated by the same method as that used by the area density distribution estimating part 13 in the first embodiment.

The line detector 19 couples small areas vertically contiguous to each other out of the small areas which are judged as having the entry of a character by the entry existence judging part 14, thereby detecting a resultant area as a line area including a height of the character (vertical width of the character).

The line detecting method used by the line detector 19 is not limited to such a method. For example, a method known in a character recognition apparatus may be used, namely, to create a histogram by counting the number of black pixels in a line direction and based on the histogram, detect, as a line position, a range where the counted number exceeds a predetermined value.

That is, the line detector 19 functions as a first area detector that detects a line area including an entry width of a character (a height of the character) extending in a specific direction, for example, a vertical direction or the like, from the small areas (sectional areas which are laterally long) judged as having the entry of a character.

For example, the line detection result output part 20 is constituted of at least one of a display device such as a monitor, a printing device such as a printer, and a memory such as a hard disk drive, and outputs the line detection result obtained by the line detector 19.

Hereinafter, the operation of the image processing apparatus of the third embodiment will be described with reference to FIG. 9 and FIG. 10.

Figure 9:
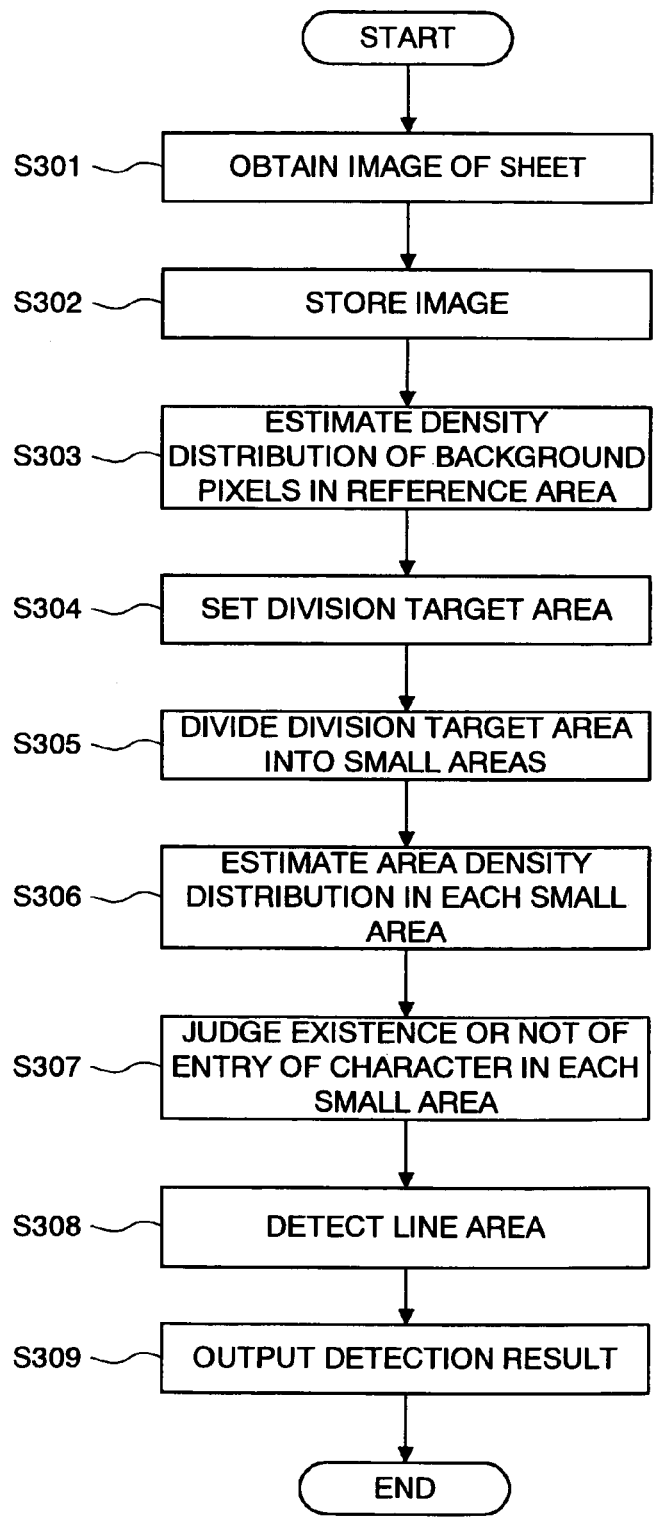
FIG. 9 is a flowchart showing the operation of the image processing apparatus of the third embodiment.

As in the first embodiment, this image processing apparatus obtains an image of a sheet by the scanner 1 and stores the obtained image in the original image memory 11 (S301 to S302 in FIG. 9).

The background density distribution estimating part 12 reads an original image stored in the original image memory 11 to estimate the density distribution of background pixels in a designated reference area (S303).

The area density distribution estimating part 13 sets a region including at least a desired designated area as a division target area (S304) to equally divide the division target area in the longitudinal direction (vertical direction) into a plurality of slender, small areas (S305), and estimates the density distribution in each of the slender, small areas generated by the longitudinal division (S306).

The desired area is a region in an image which includes at least a portion having the entry of a character and from which noise is to be eliminated.

That is, the area density distribution estimating part 13 divides the original image at a preset pitch in the vertical direction to equally divide the original image in the vertical direction into the plural small areas.

Figure 10:
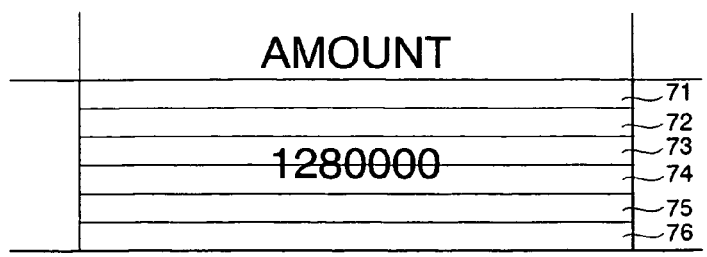
FIG. 10 is a view showing an example of line area detection in the image processing apparatus of the third embodiment.

For example, if the designated area in the original image shown in FIG. 4 is divided in the longitudinal direction (direction in which the image is divided at a predetermined pitch in the vertical direction: first direction), a plurality of small areas 71 to 76 into which the original image is equally divided in the longitudinal direction (direction in which the image is divided at the predetermined pitch in the vertical direction) are generated, as shown in FIG. 10.

In this example, the original image is divided at an equal pitch in the longitudinal direction (direction in which the image is divided at a predetermined pitch in the vertical direction), so that the plural small areas 71 to 76 are generated, but the area division pitch need not be fixed as in this example, but any method may be used providing that an upper end and a lower end of a line can be expected to be proximate to one of division boundaries regardless of the position of the line.

The entry existence judging part 14 judges the existence or not of the entry of a character in each of the small areas 71 to 76 corresponding to the respective lines generated by the division, based on the density distribution of the background pixels estimated by the background density distribution estimating part 12 and the density distribution of pixels in the relevant area estimated by the area density distribution estimation area 13 (S307).

The existence or not of the entry of a character is judged by the same method as that in the first embodiment.

The line detector 19 couples vertically contiguous small areas out of the small areas which are judged as having the entry by the entry existence judging part 14, thereby detecting a resultant area as a line area including the vertical width of the character (S308).

In the example shown in FIG. 10, the original image is divided into the small areas 71, 72, 73, 74, 75, 76 in order from the top, and the small areas 71, 72, 75, 76 are judged as having no entry of a character and the small areas 73, 74 are judged as having the entry of a character.

In this case, the line detector 19 couples the upper small area 73 and the small area 74 immediately under, and an area generated by the coupling is detected as the line area including at least the vertical width of the entered character.

When the line area is thus detected by the line detector 19, the line detection result output part 20 outputs the line area detection result to the screen of the display device, the printer, or the like (S309), so that an operator can confirm the line area detection result by the PC 3.

As described above, the image processing apparatus of the third embodiment includes the line detector 19 which divides a processing target area in the original image in the vertical direction into the plural small areas, couples the small areas which are determined as having a character as a result of the character existence judgment in each of the small areas, and detects the line area having a character or a character group (character string). Consequently, it is possible to correctly detect a line including a character or a character group (character string) entered into the original image, without any influence of noise.

Fourth Embodiment

Hereinafter, a fourth embodiment of the present invention will be described.

Figure 11:
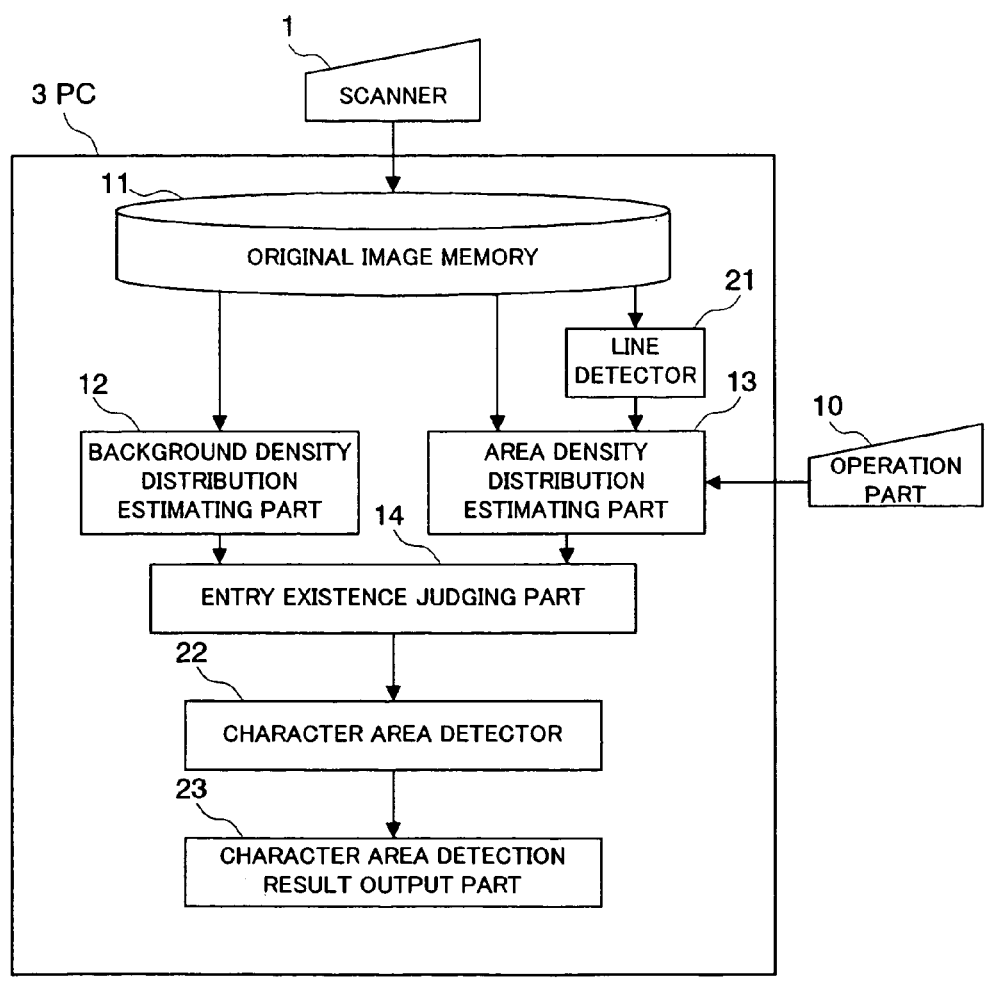
FIG. 11 is a block diagram showing a configuration of an image processing apparatus according to a fourth embodiment of the present invention.

FIG. 11 is a block diagram showing a configuration of an image processing apparatus of the fourth embodiment.

The image processing apparatus of the fourth embodiment includes a scanner 1 and a PC 3 as shown in FIG. 11.

In the fourth embodiment, the same reference numerals are used to designate the same components as those of the first embodiment, and description thereof will be omitted.

The PC 3 includes an operation part 10, an original image memory 11, a background density distribution estimating part 12, an area density distribution estimating part 13, an entry existence judging part 14, a line detector 21, a character area detector 22, a character area detection result output part 23, and so on.

The background density distribution estimating part 12, which has the same function as that of the first embodiment, estimates the density distribution of background pixels.

The line detector 21 has the same functions as those of, for example, the area density distribution estimating part 13, the entry existence judging part 14, and the line detector 19 described in the third embodiment, and detects a line area including a character from an original image.

That is, the line detector 21 functions as a first area density distribution estimating part that estimates the density distribution of each of small areas into which a designated area in the original image is divided in a longitudinal direction.

The line detector 21 further functions as a first entry existence judging part that judges the existence or not of the entry of a character in each of the small areas, based on the density distribution of the pixels in the background area estimated by the background density distribution estimating part 12 and the density distribution in each of the small areas estimated by itself.

Further, the line detector 21 couples vertically contiguous small areas out of the small areas judged as having the entry of a character, thereby detecting a resultant area as a line area including an entry width of the character.

A method of detecting the line area need not be limited to the method described in the third embodiment, but any method may be used providing that it can detect a line.

The area density distribution estimating part 13 functions as a second area density distribution estimating part that divides the line area detected by the line detector 21 in a second direction (direction in which the line area is divided at a predetermined pitch in a lateral direction) perpendicular to the longitudinal direction, and estimates the density distribution of each of small areas generated by the division.

That is, the area density distribution estimating part 13 sectionalizes, in the second direction, the line area including the character detected by the line detector 21 so that lateral intervals become equal to one another, thereby dividing the line area into a plurality of still smaller areas, and it estimates the density distribution in each of the small areas generated by the division.

The area density distribution estimating part 13 estimates the density distribution by the same method as that used by the area density distribution estimating part 13 in the first embodiment.

In this example, the dividing direction of the line area is the second direction (left/right direction) perpendicular to the longitudinal direction. However, the dividing direction does not necessarily have to be perpendicular to the longitudinal direction, but may be any direction in which the line area can be divided into small areas.

For example, the line area may be divided in an oblique direction (intersecting direction) or by a curve.

The entry existence judging part 14 functions as a second entry existence judging part that judges the existence or not of the entry of a character in each of the small areas, based on the density distribution of the pixels in the background area estimated by the background density distribution estimating part 12 and the density distribution in each of the small areas estimated by the area density distribution estimating part 13.

That is, the entry existence judging part 14 judges the existence or not of the entry in each of the small areas generated by the division of the line area, based on the density distribution of the background pixels and the density distribution of each of the small areas.

Note that the same method as that in the first embodiment is used to judge the existence or not of the entry.

The character area detector 22 couples laterally contiguous small areas out of the small areas which are judged as having the entry of a character by the entry existence judging part 14, thereby detecting a resultant area as an area including a character or a character group (character string).

That is, the character area detector 22 functions as a second area detector that couples the laterally contiguous small areas out of the small areas which are judged as having the entry of a character by the entry existence judging part 14, thereby detecting a resultant area as an area including an entry range of the character, namely, an area surrounding the character (character area).

Hereinafter, the operation of the image processing apparatus of the fourth embodiment will be described with reference to FIG. 12.

Figure 12:
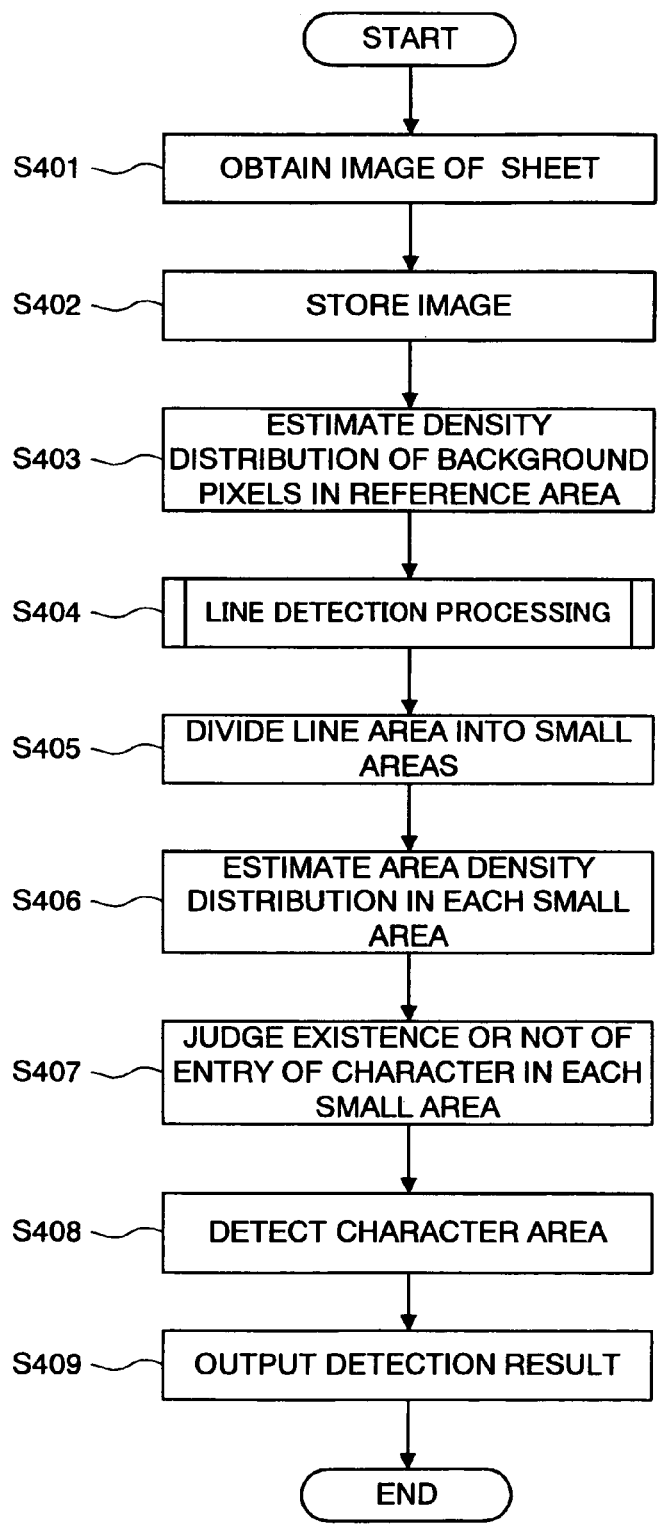
FIG. 12 is a flowchart showing the operation of the image processing apparatus of the fourth embodiment.

As in the first embodiment, the image processing apparatus of the fourth embodiment obtains an image of a sheet by the scanner 1 and stores the obtained image in the original image memory 11 (S401 to S402 in FIG. 12).

The background density distribution estimating part 12 reads the original image stored in the original image memory 11 to estimate the density distribution of the background pixels (S403).

A reference area may be designated via the operation part 10, or may be set in advance if images to be processed are substantially fixed in size. Further, the reference area may be an image different from the image to be processed or a different image area.

That is, the reference area is an area based on which the pixel density of the whole front face of a sheet is estimated.

For example, the line detector 21 executes the line area detection processing at S305 to S309 in FIG. 9 (S404) shown in the third embodiment to detect a line area having the entry of a character in a designated area in the original image.

Specifically, the line detector 21 displays on a screen the original image read from the original image memory 11 and also displays a window prompting an operator to designate an area.

Here, in response to an operator's operation on the operation part 10 for designating a desired area in the original image, the line detector 21 sets, as a division target area, a region including at least the designated area to divide the division target area in the lateral direction into a plurality of equal small areas, and estimates the density distribution in each of the small areas generated by the lateral division.

More specifically, the line detector 21 displays on the screen the original image read from the original image memory 11 and also displays a window prompting an operator to designate an area.

Here, in response to an operator's operation on the operation part 10 for designating a desired area in the original image, the line detector 21 sets, as a division target area, a region including at least the designated area to equally divide the division target area in the longitudinal direction into a plurality of slender, small areas, and estimates the density distribution in each of the slender small areas generated by the longitudinal division.

The line detector 21 judges the existence or not of the entry of a character in each of the slender, small areas (small areas 71 to 76 in FIG. 10) generated by the division, based on the estimated density distribution of the background pixels and the density distribution of pixels in the relevant area.

Finally, the line detector 21 couples vertically contiguous small areas out of the small areas judged as having the entry of a character, thereby detecting a resultant area as a line area including a vertical width of the character (an area consisting of the coupled small areas 73 and 74 in FIG. 10).

When the line area having the entry of the character is thus detected by the line detector 21, the area density distribution estimating part 13 equally sectionalizes the line area detected by the line detector 21, in the lateral direction at a predetermined pitch to divide the line area (S405), thereby generating a plurality of still smaller areas generated by the division of the line area, and estimates the density distribution in each of these small areas (S406).

That is, after the line detector 21 first detects the line area in the designated area, the area density distribution estimating part 13 further divides the line area in the lateral direction (line direction) at a predetermined pitch, thereby generating the still smaller areas.

For example, when the designated area in the original image in FIG. 4 is divided in the vertical direction and a line is detected, the line area consisting of the coupled small areas 73 and 74 shown in FIG. 10 is generated.

Figure 13:
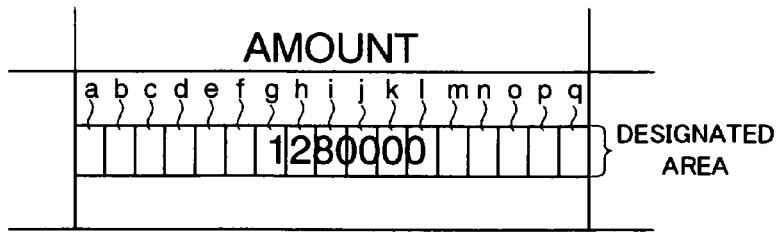
FIG. 13 is a view showing an example of character area detection in the image processing apparatus of the fourth embodiment.

When this generated line area is further sectionalized and divided in the lateral direction at a predetermined pitch, the line area is divided into a plurality of minute small areas a to q as shown in FIG. 13.

The line area need not be divided at a fixed pitch, but may be divided by any method providing that a left end and a right end of a character can be expected to be proximate to one of division boundaries, regardless of the position of the character.

After the density distribution in each of the small areas is estimated by the area density distribution estimating part 13, the entry existence judging part 14 judges the existence or not of the entry of a character in each of the small areas a to q into which the line area is divided, based on the density distribution of the background pixels and the density distribution of each of the small areas a to q (S407).

Then, the character area detector 22 couples the small areas g to 1 which are judged as having the entry of a character by the entry existence judging part 14 and are contiguous to each other, thereby detecting a resultant area as an area including a character or a character group (character string) (S408).

This area is called an area including an entry range of predetermined information.

Specifically, the line area first obtained by the division of the original image is divided in the lateral direction by the entry existence judging part 14 into, for example, the plural equal small areas a to q in order from the left, and among them, the small areas a to f, m to q are judged as having no entry and the small areas g to 1 are judged as having the entry.

In this case, the character area detector 22 detects an area consisting of the coupled plural small areas g to 1 which are judged as having the entry and are contiguous to each other, as an area including a character or a character group (character string).

After the area including a character or a character group (character string) is thus detected by the line detector 19, the character area detection result output part 23 outputs the character area detection result to the screen of the display device, the printer, or the like (S409), so that the operator can confirm the character area detection result by the PC 3.

As described above, the image processing apparatus of the fourth embodiment includes: the line detector having the functions of the area density distribution estimating part 13, the entry existence judging part 14, and the line detector 19 of the third embodiment; and the character area detector 22 that detects the character area based on the result of judging the existence or not of the entry of a character in each of the small areas a to q into which the line area detected by the line detector 21 is further divided. Therefore, it is possible to correctly detect an area including a character or a character group without any influence by noise.

Fifth Embodiment

Hereinafter, an image processing apparatus according to a fifth embodiment of the present invention will be described.

Figure 14:
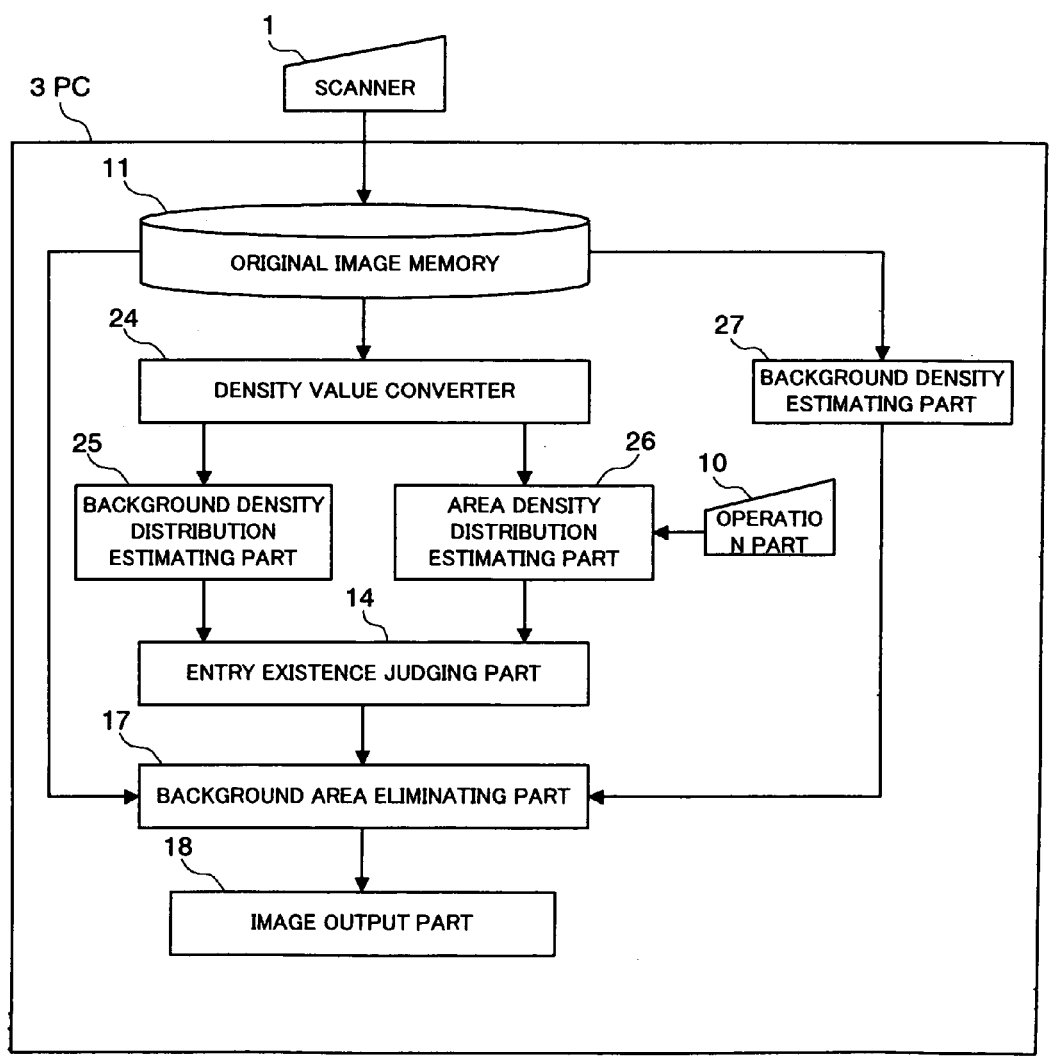
FIG. 14 is a block diagram showing a configuration of an image processing apparatus according to a fifth embodiment of the present invention.

FIG. 14 is a block diagram showing a configuration of the image processing apparatus of the fifth embodiment.

The image processing apparatus of the fifth embodiment is an example where a color image in which each pixel is represented by a set of plural density values is processed as an original image.

The image processing apparatus of the fifth embodiment includes a scanner 1 and a PC 3 as shown in FIG. 14. In the fifth embodiment, the same reference numerals are used to designate the same components as those of the first and the second embodiment, and description thereof will be omitted.

The PC 3 includes an operation part 10, an original image memory 11, an entry existence judging part 14, a density value converter 24, a background density distribution estimating part 25, an area density distribution estimating part 26, a background density estimating part 27, a background area eliminating part 17, an image output part 18, and so on.

The original image memory 11 stores as an original image a color image inputted from the scanner 1.

The density value converter 24 converts a set of the density values of each pixel of the original image obtained from the original image memory 11 to a set of density values in a representation format same as or different from that of a set of the density values of the original image.

The background density estimating part 25 estimates the distribution of the density of background pixels of the original image, the density here being that after the conversion by the density converter 24.

The area density distribution estimating part 26 estimates the distribution of density in each of areas into which the original image is divided, the density being that after the conversion by the density value converter 24.

The background density estimating part 27 estimates the background density of the original image.

For each of the areas into which the original image is divided, the entry existence judging part 14 judges the existence or not of the entry of a character in the relevant area based on the density distribution of background pixels and the area density distribution.

The background area eliminating part 17 replaces a set of the density values of pixels in an area which is judged as having no entry of a character by the entry existence judging part 14, by a set of the background density values estimated by the background density estimating part 27, thereby correcting the original image, and sends the corrected original image to the image output part 18, which then outputs the received output image.

The density value converter 24 converts a set of M density values of each pixel of the original image to a set of N pieces of density values in a representation format same as or similar to that of a set of the density values of the original image.

The background density estimating part 27 defines, as a reference area, an area pre-designated in the original image inputted from the scanner 1, and estimates the background density by, for example, finding a median value of density $X(i)$ of each density value number i in the reference area.

A method of estimating the background density is not limited to the above method, and any other method may be used providing that it finds a representative set as a set of the density values in the reference area.

A method of designating the reference area is, for example, to temporarily binarize the original image with a predetermined threshold value and designate, as the reference area, a set of pixels in the image after the binarization, which have no black pixel within a predetermined distance.

Any other method may be used to designate the reference area, providing that it designates an area that can be expected to consist of only the background pixels.

The background density distribution estimating part 25, which is substantially the same as the background density distribution estimating part 12 in the first embodiment, estimates the density distribution of the background pixels.

The background density distribution estimating part 25 is different from the background density distribution estimating part 12 in the first embodiment in the following respect. That is, the distribution estimation target of the background density distribution estimating part 12 in the first embodiment is a single density value since a black-and-white image is assumed there, while the distribution estimation target of the background density distribution estimating part 25 in the fifth embodiment is a set of density values resulting from the conversion by the density value converter 24.

The area density distribution estimating part 26 estimates the distribution of the density resulting from the conversion by the density value converter 24, in each of the areas into which the original image is divided.

The density distribution itself is estimated by substantially the same method as that used by the area density distribution estimating part 13 in the first embodiment.

The area density distribution estimating part 26 in the fifth embodiment and the area density distribution estimating part 13 in the first embodiment are different in the following respect. That is, in the area density distribution estimating part 13 in the first embodiment, the distribution estimation target is a single density value since a black-and-white image is assumed there, whereas in the area density distribution estimating part 26 in the fifth embodiment, the distribution estimation target is a set of density values resulting from the conversion by the density value converter 24.

In the image processing apparatus of the fifth embodiment, the original image is divided in the same method as that used in the area division in the second embodiment.

The entry existence judging part 14 judges the existence or not of the entry of a character in a designated area based on the density distribution of the background pixels estimated by the background density distribution estimating part 25 and the density distribution of the pixels in the designated area estimated by the area density distribution estimating part 26.

A method of judging the existence or not of the entry of a character is to find an evaluation value as a criterion for evaluating to what degree the distribution of a set of the density values in the designated area deviates from the distribution of a set of the density values in the background, compare the evaluation value with a predetermined threshold value, and judge that the entry of a character exists when the evaluation value is equal to or larger than the predetermined threshold value, while judging that the entry of a character does not exist when the evaluation value is smaller than the threshold value.

As the evaluation value as a criterion for evaluating to what degree the distribution of a set of the density values in the designated area deviates from the distribution of a set of the density values in the background, used is an evaluation value $E_3$ given by the following expression, where $(Y(1), \ldots Y(N))$ is a set of the density values of a pixel, $f(Y(1), \ldots Y(N))$ is the density distribution in the background, and $g(Y(1), \ldots Y(N))$ is the density distribution in the designated area.

$$E_3 = \int [f(Y(1), \ldots, (N)) - g(1), \ldots, (Y(N))] \ln[f(Y(1), \ldots, (Y(N))] dx$$

Besides the above, the evaluation value $E_4$ given by the following expression is also usable.

$$E_4 = \int f(Y(1), \ldots, Y(N)) \{ \ln[f(Y(1), \ldots, Y(N))] - \ln[g(Y(1), \ldots, Y(N))] \} dx$$

The evaluation value used here is not limited to those given by the above expressions, but any other evaluation value may be used providing that it reflects a deviation degree of the density distribution in the designated area from the density distribution in the background.

The background area eliminating part 17 replaces a set of the density values of pixels in an area in the original image which is judged as having no entry of a character by the entry existence judging part 14, by a set of the density values estimated by the background density estimating part 27, thereby correcting the original image and thus generating an output image.

That is, the background area eliminating part 17 functions as an area density replacing part that replaces a set of the density values in the area which is judged as having no entry of a character by the entry existence judging part 14, by a set of the background density values estimated by the background density estimating part 27.

Post processing in a case where, for example, character recognition software is installed in the PC 3 is to activate the character recognition software and execute character recognition processing on an image from which noise has been eliminated.

In this case, the character recognition software executes the character recognition processing by using the image (image having undergone noise elimination) outputted to the image output part 18, so that highly accurate result of character recognition can be obtained.

Figure 15:
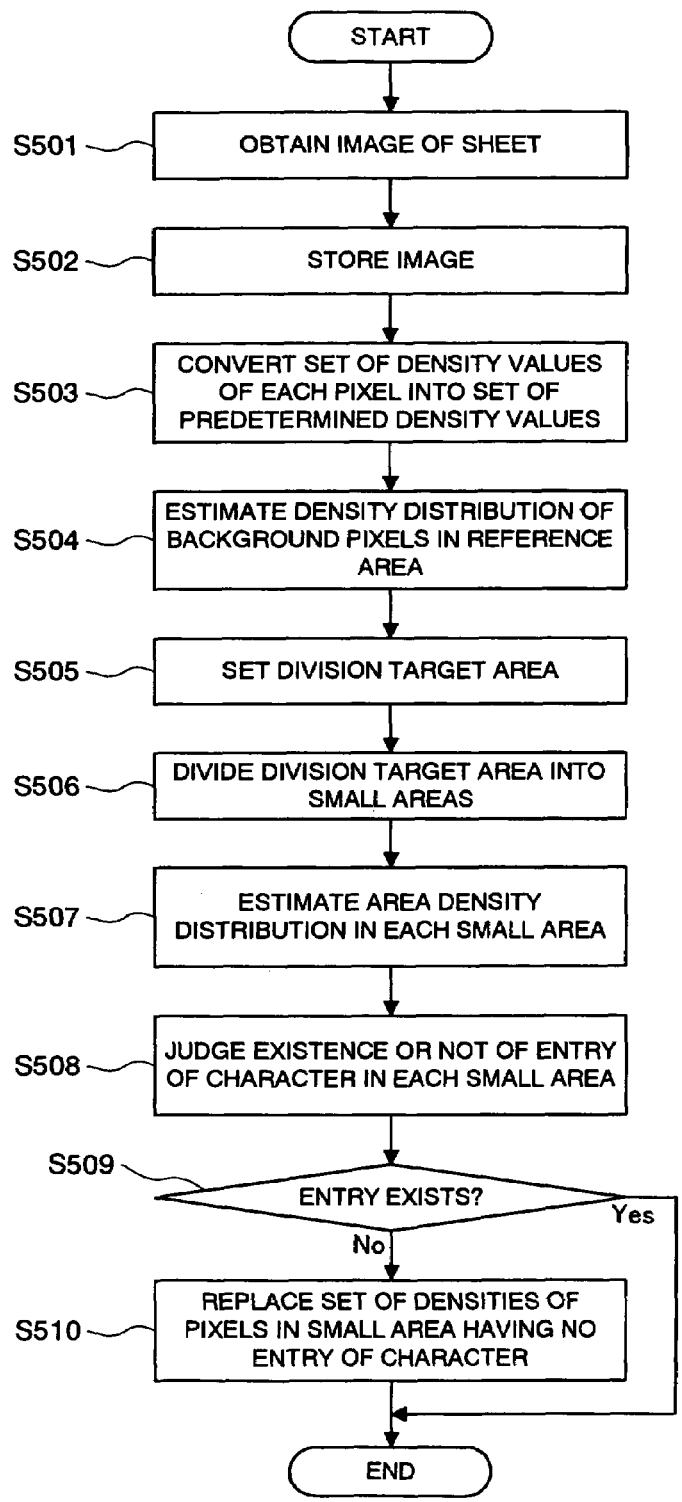
FIG. 15 is a flowchart showing the operation of the image processing apparatus of the fifth embodiment.

The operation of the image processing apparatus of the fifth embodiment will be described below with reference to the flowchart in FIG. 15. As in the first embodiment, this image processing apparatus obtains an image of a sheet by the scanner 1 and stores the obtained image in the original image memory 11 (S501 to S502 in FIG. 15).

The density value converter 24 reads an original image (input image) stored in the original image memory 11 and converts a set of M density values of each pixel of the original image into a set of N pieces of density values in a representation format same as or different from a representation format of a set of the density values of the original image (S503).

When the original image is a color image as in this example, each pixel of the original image is represented by plural density values. In the following description, "M" represents the number of density values forming each pixel, "i" represents the density value number, and X(i) represents an "i'th density value".

In the following description, "j" represents the density value number after the conversion, and Y(j) represents a "j'th density value" after the conversion.

"N", which represents the number of the density values after the conversion, may be equal to or larger than "M" or may be less than "M" providing that it is 1 or more.

For example, suppose that the original image is expressed by three values of the RGB format, X(1), X(2), and X(3) being a density value of a red component, a density value of a green component, and a density value of a blue component, respectively. In this case, M=3, and possible conversion may be: N=3 and Y(1)=X(1), Y(2)=X(2), and Y(3)=X(3); N=1 and Y(1)=(X(1)+X(2)+X(3))/3; or N=3 and Y(1) is a hue value of a HSI color system, Y(2) is a color saturation value, and Y(3) is a brightness value.

A method of calculating Y(j) is not limited to the method described here, but may be any providing that it calculates Y(j) from a set of the density values of each pixel in the original image.

The background density distribution estimating part 25 estimates the density distribution of the background pixels in a reference area designated in an image area represented by the density values resulting from the conversion by the density value converter 24 (S504).

The reference area may be designated via the operation part 10, or when images to be processed are substantially fixed in size, an area for reference may be set in advance in a memory or the like. Further, the reference area may be an image different from the image to be processed or may be a different image area.

That is, the reference area is an area based on which the pixel density on the whole front face of a sheet is estimated.

The area density distribution estimating part 26 displays on a screen the image represented by the density values resulting from the conversion by the density converter 24 and also displays a window prompting an operator to designate an area.

The area density distribution estimating part 26 sets a region including at least a desired designated area, as a division target area (S505) to divide this area into a plurality of equal small areas (S506), and estimates the density distribution in each of the small areas generated by the division (S507).

The desired area is a region of an image which includes at least a portion having the entry of a character and from which noise is to be eliminated.

For each of the small areas 62 into which the original image is divided, the entry existence judging part 14 judges whether or not a character or the like has been entered into each of the small areas 62 (existence or not of the entry), based on the density distribution of the background pixels and the area density distribution (S508).

The existence or not of the entry of a character or the like is judged based on the difference of the density distribution.

For example, an alphabet, a numeral, a kana character, a kanji character, a sign, a drawing, and the like correspond to a character.

For each small area for which judgment by the entry existence judging part 14 turns out that the small area has no entry of a character (No at S509), the background area eliminating part 17 replaces a set of the density values of pixels in the small area having no entry of a character, by a set of the background density values estimated by the background density estimating part 27.

Consequently, the background area eliminating part 17 corrects the original image (S510) to transmit it to the image output part 18.

The image output part 18 outputs the output image received from the background area eliminating part 17.

Consequently, a color image from which noise that should exist in the background is eliminated is generated.

The image output part 18 performs at least one image output processing regarding the corrected color image, for example, to save it in the hard disk drive under a different name from the name of a file of the original image, to print it on paper, or to display it on the display screen.

Note that, if the small area is judged as having the entry of a character by the entry existence judging part 14 (Yes at S50), no image correction processing is applied to this small area.

As described above, the image processing apparatus of the fifth embodiment includes: the density value converter 24 that converts the density values of the original image; the background density estimating part 27 estimating a set of the background density values; and the background area eliminating part 17 that replaces a set of the density values of pixels in an area having no entry of a character, by a set of the background density values estimated by the background density estimating part 27, thereby correcting the image. Therefore, it is possible to eliminate noise from an area in a density image which can be judged as having no entry of a character, without any influence of noise-even when an image inputted from the scanner 1 is a color image.

That is, according to the embodiment described above, the entry existence judging part 14 sets, as the reference area, an area in which the number of the pixels is large enough to allow the estimation of the density distribution of the whole image and judges the existence or not of the entry in the designated area in which a character should have been entered. Consequently, the judgment on the existence or not of the entry of a character or the like, the elimination of noise from the density image, the line detection, and the detection of an area including a character or a character group (character string) can be more stably performed in an image where the background noise is prominent and thus the density of a single pixel cannot be a basis of discriminating the entry of a character from noise.

The present invention is not limited to the embodiments described based on the drawings, but expansion and modification may be made therein. It is understood that expansion and modification included in the range of the following claims are all included in the technical scope of the present invention.

The above embodiments have described the examples where the background density distribution estimating part and the background density estimating part find the background density distribution and the background density respectively by calculation, but for example, specific values may be registered in a ROM or the like for use as the background density distribution and the background density.

What is claimed is:

1. An image processing apparatus, comprising:
   a background density distribution estimating part that estimates density distribution of pixels in a background area in an image to be processed;
   an area density distribution estimating part that estimates density distribution in a designated area in the image; and
   an entry existence judging part that judges existence or not of entry of predetermined information in the designated area, based on the density distribution of the pixels in the background area estimated by said background density distribution estimating part and the density distribution in the designated area estimated by said area density distribution estimating part.

2. The image processing apparatus as set forth in claim 1, further comprising:
   a background density estimating part that estimates density of the pixels in the background area in the image,
   wherein said area density distribution estimating part estimates density distribution in each of small areas into which the designated area is divided, and
   wherein said entry existence judging part includes a first entry existence judging part that judges the existence or not of the entry of the predetermined information in each of the small areas in the image, based on the density distribution of the pixels in the background area estimated by said background density distribution estimating part and the density distribution in each of the small areas estimated by said area density distribution estimating part.

3. The image processing apparatus as set forth in claim 2, further comprising:
   an area density replacing part that replaces the density of the small area in the image which is judged as having no entry of the predetermined information by said first entry existence judging part, by the background density estimated by said background density estimating part.

4. The image processing apparatus as set forth in claim 3, wherein said area density replacing part fills the small area in the image which is judged as having no entry of the predetermined information by said first entry existence judging part, by the background density estimated by said background density estimating part.

5. The image processing apparatus as set forth in claim 3, further comprising:
- a density value converter that converts a set of M density values of each pixel of an image in which each pixel is represented by a set of plural density values, into a set of N pieces of density values in a representation format same as or similar to a representation format of the set of the density values of the image, and inputs a resultant image to said background density distribution estimating part,
- wherein said area density replacing part replaces a set of density values in the area which is judged as having no entry of the predetermined information by said entry existence judging part, by a set of background density values estimated by the background density estimating part.

6. The image processing apparatus as set forth in claim 2,
- wherein said area density distribution estimating part includes a first area density distribution estimating part that estimates density distribution of each of small areas into which the designated area in the image is divided in a first direction, and the apparatus further comprising:
- a first area detector that detects an area including an entry width of the predetermined information in or near the small area which is judged as having the entry of the predetermined information by the first entry existence judging part.

7. The image processing apparatus as set forth in claim 6,
- wherein said first area detector couples contiguous small areas out of the small areas judged as having the entry of the predetermined information, and detects a resultant area as the area including the entry width of the predetermined information.

8. The image processing apparatus as set forth in claim 6,
- wherein said first area detector detects the area including the entry width of the predetermined information extending in a specific direction, from the small areas judged as having the entry of the predetermined information.

9. The image processing apparatus as set forth in claim 8, further comprising:
- a second area density distribution estimating part that estimates density distribution of each of small areas into which the area detected by said first area detector is divided in a second direction intersecting with the specific direction;
- a second entry existence judging part that judges the existence or not of the entry of the predetermined information in each of the small areas based on the density distribution of the pixels in the background area estimated by said background density distribution estimating part and the density distribution of each of the small areas estimated by said second area density distribution estimating part; and
- a second area detector that detects an area including an entry range of the predetermined information out of the small areas which are judged as having the entry of the predetermined information by said second entry existence judging part.

10. The image processing apparatus as set forth in claim 9,
- wherein each of said first area detector and said second area detector couples contiguous small areas out of the small areas judged as having the entry of the predetermined information, and detects a resultant area as the area including the entry width of the predetermined information.

11. An image processing method where a computer processes an image, comprising:
- estimating, by the computer, density distribution of background pixels out of pixels forming the image to be processed;
- estimating, by the computer, density distribution in a predetermined area in the image;
- judging, by the computer, existence or not of entry of a character which is predetermined information, in the designated area, based on the estimated density distribution of the background pixels and the estimated density distribution in the designated area.

* * * * *